(12) United States Patent
Park et al.

(10) Patent No.: US 7,842,125 B2
(45) Date of Patent: *Nov. 30, 2010

(54) PROCESS FOR REFINING NITROGEN TRIFLUORIDE GAS USING ALKALI EARTH METAL EXCHANGED ZEOLITE

(75) Inventors: Yong-Chul Park, Seongnam-si (KR); Woo-Sik Jeong, Seoul (KR); Kwang-Chul Hyun, Anyang-si (KR); Jang-Won Lee, Anyang-si (KR); Ik-Hyeon Kwon, Seoul (KR)

(73) Assignee: Hyosung Corporation, Seoul (KR)

( * ) Notice: Subject to any disclaimer, the term of this patent is extended or adjusted under 35 U.S.C. 154(b) by 456 days.

This patent is subject to a terminal disclaimer.

(21) Appl. No.: 11/631,659

(22) PCT Filed: Jul. 7, 2005

(86) PCT No.: PCT/KR2005/002178

§ 371 (c)(1),
(2), (4) Date: Jan. 5, 2007

(87) PCT Pub. No.: WO2006/006791

PCT Pub. Date: Jan. 19, 2006

(65) Prior Publication Data

US 2008/0019894 A1    Jan. 24, 2008

(30) Foreign Application Priority Data

| Jul. 8, 2004 | (KR) | 10-2004-0053042 |
| Jul. 8, 2004 | (KR) | 10-2004-0053046 |
| Jul. 8, 2004 | (KR) | 10-2004-0053049 |

(51) Int. Cl.
*B01D 53/02* (2006.01)

(52) U.S. Cl. .................. 95/131; 423/240 S; 95/900

(58) Field of Classification Search .............. 96/108, 96/153; 95/128, 131, 148, 900, 902; 423/716, 423/717, 239.2, 240 S, 406; 502/60

See application file for complete search history.

(56) References Cited

U.S. PATENT DOCUMENTS

| 3,356,450 | A |   | 12/1967 | Heinze |
| 4,193,976 | A | * | 3/1980 | Lileck et al. ............... 423/406 |
| 4,933,158 | A | * | 6/1990 | Aritsuka et al. ............ 423/210 |
| 4,948,571 | A | * | 8/1990 | Harada et al. ............ 423/240 S |
| 4,980,144 | A |   | 12/1990 | Koto et al. |
| 5,053,372 | A | * | 10/1991 | Brownscombe ............... 502/60 |
| 5,069,690 | A |   | 12/1991 | Henderson et al. |
| 5,069,887 | A |   | 12/1991 | Suenaga et al. |
| 5,976,222 | A |   | 11/1999 | Yang et al. |
| 6,187,077 | B1 |  | 2/2001 | Li |
| 7,384,618 | B2 | * | 6/2008 | Singh et al. ............... 423/406 |
| 2001/0049998 | A1 | * | 12/2001 | Rode et al. .................. 95/117 |
| 2003/0029314 | A1 | * | 2/2003 | Nakamura et al. ............ 95/117 |
| 2003/0221556 | A1 |   | 12/2003 | Igumnov et al. |

FOREIGN PATENT DOCUMENTS

| EP | 1338558 A2 | 8/2003 |
| JP | 60-127218 A | 7/1985 |
| JP | 2-207838 | 8/1990 |
| JP | 3-208806 A | 9/1991 |
| JP | 5-70112 A | 3/1993 |
| JP | 7-39752 A | 2/1995 |
| JP | 7-132211 | 5/1995 |
| WO | WO 2006/006792 A | 1/2006 |

OTHER PUBLICATIONS

English Translation of Office Action, dated Nov. 20, 2009, Issued in Japanese Patent Application No. 2007-520232.
Extended European Search Report, dated Jun. 18, 2009, Issued in European Patent Application No. 05780121.9-1213.

* cited by examiner

*Primary Examiner*—Frank M Lawrence
(74) *Attorney, Agent, or Firm*—Dickstein Shapiro LLP

(57) ABSTRACT

Disclosed herein are a process for the refinement of nitrogen trifluoride gas and an adsorbent used therein. A nitrogen trifluoride (NF3) gas including carbon tetrafluoride (CF4) as an impurity is permeated into a bed of the zeolite 3 A, 4A or 5 A which is ion exchanged with alkali earth metal and is thermally treated at 150 to 600° C. for 0.5 to 100 hours so as to selectively adsorb nitrogen trifluoride onto the bed, followed by the desorption of the nitrogen trifluoride therefrom.

6 Claims, No Drawings

PROCESS FOR REFINING NITROGEN TRIFLUORIDE GAS USING ALKALI EARTH METAL EXCHANGED ZEOLITE

TECHNICAL FIELD

The present invention relates, in general, to the refinement of nitrogen trifluoride (NF3) gas and, more particularly, to a process for refining nitrogen trifluoride gas through the removal of carbon tetrafluoride (CF4) therefrom.

BACKGROUND ART

In the semiconductor industry, nitrogen trifluoride has a variety of applications, including as a fluorine source for plasma etch, a cleaning agent for CVD reactors, and a dry etchant for semiconductors. Besides, nitrogen trifluoride is useful as a rocket fuel. With the development of the semiconductor industry, the nitrogen trifluoride gas has been in great demand. The increasing demand for a gas without any environmental pollution increased the demand for the nitrogen triflurode gas by geometric progression. As a matter of course, nitrogen trifluoride gas for use in these applications is required to be of high purity.

Nitrogen trifluoride can be prepared by various methods, including the direct fluoridation of ammonia, the use of plasma to react ammonia with fluorine, and molten salt electrolysis for electrolyzing NH4·xHF(x:1.8~2.1) with ammonium fluoride or hydrogen fluoride used as a material.

In most cases, when using these methods, impurities, such as nitrous oxide (N2O), carbon dioxide (CO2), carbon tetrafluoride (CF4), dinitrogen difluoride (N2F2), etc., are concurrently produced in large amounts, so that purification is necessary to obtain highly pure NF3.

Particularly, CF4, produced as an impurity upon the production of NF3, is difficult to be removed from NF3 by general methods such as distillation, bulk adsorption, etc., because of the similarity therebetween in boiling point (NF3: −129° C., CF4: −128° C.), molecular size (NF3: 4.5 Å, CF4: 4.8 Å), and adsorption heat (Dipole moment: NF3: 0.235D, CF4: 0D). Accordingly, the refinement of NF3 generally requires the use of adsorbents, and active carbon, active alumina, and synthetic zeolite are well known as adsorbents. Active carbon and active alumina, however, is highly disadvantageous in terms of labor and cost because they must be frequently changed with fresh adsorbent or regenerated owing to its poor capacity for adsorbing impurities, which result in an inevitable loss of NF3 gas.

U.S. Pat. No. 5,069,887, yielded to Takashi et al., discloses a method of refining nitrogen trifluoride gas, in which synthetic zeolite having a certain porosity and water content is used as an adsorbent under predetermined temperature and flow speed conditions so as for NF3 gas to be adsorbed thereinto and then desorbed therefrom. This method, however, is disadvantageous in that an additional desorption process must be conducted, and the water content of the synthetic zeolite must be adjusted to be within a predetermined range. In addition, the NF3 gas refined by this method has a purity of 93% or less so that it cannot be directly applied to fields requiring high purity.

Another refining method using synthetic zeolite can be found in U.S. Pat. No. 5,069,690, yielded to Philip et al., which discloses the kinetic separation of gas mixture using gas-solid chromatography. In this method, hydrothermally treated zeolite having a certain porosity is used as an adsorbent and discrete pulses of a mixture of gases are passed through a bed of the porous adsorbent that kinetically adsorbs one gas more readily than the other gases, resulting in the selective separation of NF3 gas. However, the hydrothermal pretreatment for controlling the porosity of zeolite is difficult to conduct. In addition, the available time period of the zeolite, that is, the saturation time period, is too short to apply the zeolite method in the commercialized mass purification of nitrogen trifluoride.

DISCLOSURE OF INVENTION

Technical Problem

Leading to the present invention, intensive and thorough research on the refinement of NF3 using synthetic zeolite, conducted by the present inventors, resulted in the finding that when ion-exchanged with alkali earth metal, zeolite 3A, 4A or 5A can selectively adsorb NF3 from a mixture of NF3 and CF4.

Technical Solution

The present invention pertains to a process for refining NF3 gas using zeolite 3A, 4A or 5A ion-exchanged with alkali earth metal and an adsorbent for nitrogen trifluoride, consisting, essentially, of zeolite 3A, 4A or 5A.

Commercially available zeolite 3A, 4A and 5A themselves cannot be used to purify NF3 because they cannot discriminate between NF3 and CF4 in adsorption. Both zeolite 3A and 4A have small pore sizes so as to adsorb neither of NF3 and CF4, while the pore size of zeolite 5A is large enough to adsorb both NF3 and CF4. Accordingly, the selective adsorption of NF3 requires that the adsorbent have a pore size smaller than the molecular size of CF4 but larger than the molecular size of NF3.

The change of zeolite in pore size can be achieved by ion exchange or impregnation with metal cations. The present invention features the ion exchange of zeolite 3A, 4A or 5A with an appropriate amount of alkali earth metal to modify the pore size of the zeolite. That is, the pore size of zeolite 3A, 4A or 5A is modified so that it can selectively adsorb only NF3, thereby excluded CF4 can be recovered.

Generally, ion exchange, used in the present invention, is widely used to load metal components onto a support, such as, silica, silica-alumina, zeolite, etc. In particular, the suitability of zeolite for cation exchange is useful for the loading of metal ions thereonto. The cations of zeolite can be exchanged with other cations according to types of ion and concentrations of solution. In addition to being useful in separating metal ions, the cation exchange capacity of zeolite is a measure for controlling the acidity of zeolite and introducing metal ions thereinto. Typically, zeolite type A is synthesized with sodium ions employed as cations. Zeolite type A with sodium ions serving as cations has an effective pore size of approximately 0.4 nm (type 4A). The effective pore size is 0.3 nm (type 3A) when potassium ions serve as cations and is 0.5 nm (type 5A) when calcium ions serve as cations. On zeolite, cations can be exchanged with other types according to the kinds of cations and the concentration of solutions. When loaded by ion exchange, active materials can be very homogeneously distributed over the support.

In accordance with the present invention, a process is provided for refining nitrogen trifluoride by selectively removing CF4 therefrom, in which a mixture of carbon tetrafluoride and nitrogen trifluoride is introduced into a column filled with zeolite ion-exchanged with alkali earth metal so that nitrogen trifluoride is selectively adsorbed onto and desorbed from the zeolite while carbon tetrafluoride passes through the column.

Advantageous Effects

The process according to the present invention can effectively produce high purity nitrogen trifluoride, by the removal of CF4.

BEST MODE FOR CARRYING OUT THE INVENTION

Below, a detailed description of the present invention will be given.

Zeolite used in the present invention is Zeolite 3A, 4A or 5A. In order to make their pore sizes smaller or large to filtrate selectively only NF3, the zeolite has to be ion exchanged with alkali earth metal.

Alkali earth metal suitable for ion exchange for the zeolite is one or more of beryllium(Be), magnesium(Mg), calcium (Ca), strontium(Sr) and barium(Ba). To be used for the ion exchange according to the present invention, the precursors of the alkali earth metal must be soluble in water, preferably the precursors are Nitric acid (NO3), carbonic acid (CO3), chloride(Cl), hydroxide(OH) and sulfuric acid (SO4) salts of the alkali earth metal or their hydrates.

Examples of suitable beryllium precursors include beryllium nitrate hydrate (Be(NO3)2·xH2O), beryllium chloride (BeCl2), beryllium sulfate tetrahydrate (BeSO4·4H2O), etc., preferably beryllium chloride (BeCl2).

Examples of suitable magnesium precursors include magnesium nitrate hexahydrate (Mg(NO3)2·6H2O), magnesium carbonate hydroxide pentahydrate (MgCO3·Mg(OH)2·5H2O), magnesium chloride (MgCl2), magnesium chloride hexahydrate (MgCl2·6H2O), magnesium hydroxide (Mg(OH)2), magnesium sulfate (MgSO4), magnesium sulfate monohydrate (MgSO4·H2O), magnesium sulfate heptahydrate (MgSO4·7H2O), etc. with a preference for magnesium chloride hexahydrate (MgCl2·6H2O).

Suitable calcium precursors include calcium nitrate hydrate (Ca(NO3)2·xH2O), calcium carbonate (CaCO3), calcium chloride (CaCl2), calcium chloride dihydrate (CaCl2·2H2O), calcium chloride hexahydrate (CaCl2·6H2O), calcium chloride hydrate (CaCl2·xH2O), calcium hydroxide (Ca(OH)2), calcium sulfate (CaSO4), and calcium sulfate hexahydrate (CaSO4·6H2O), with calcium chloride hexahydrate (CaCl2·6H2O) being preferred.

Suitable strontium precursors include strontium nitrate (Sr(NO3)2), strontium carbonate (SrCO3), strontium chloride (SrCl2), strontium chloride hydrate (SrCl2·xH2O), strontium hydroxide (Sr(OH)2), strontium hydroxide octahydrate (Sr(OH)2·8H2O), and strontium sulfate (SrSO4), with strontium chloride hydrate(SrCl2·xH2O) being preferred.

Examples of suitable barium precursors include barium nitrate (Ba(NO3)2), barium carbonate (BaCO3), barium chloride (BaCl2), barium chloride dihydrate (BaCl2·2H2O), barium hydroxide (Ba(OH)2), barium hydroxide monohydrate (Ba(OH)2·H2O), barium hydroxide octahydrate (Ba(OH)2·8H2O), barium sulfate (BaSO4), etc., with a preference for barium chloride dihydrate (BaCl2·2H2O).

To be used for the preparation of ion-exchanged zeolite, an aqueous solution should contain a precursor of the metal to be ion exchanged in a concentration of 0.01 to 3 M, preferably in a concentration of 0.5 to 1.5 M. For example, when the concentration of the aqueous solution containing the metal to be ion exchanged is below 0.01 M, sufficient ion exchange cannot be realized. On the other hand, when the concentration of the aqueous solution exceeds 3 M, the zeolite does not further increase in ion exchange capacity with the increment of the concentration.

In the aqueous solution, zeolite is ion-exchanged with the metal at 35 to 100° C., preferably at 50 to 80° C., for 0.5 to 24 hours, preferably 2 to 12 hours, while being stirred at a speed of 5 to 100 rpm, preferably at a speed of 10 to 50 rpm. Through the ion exchange, the pore size of the zeolite is set within a range between the molecular sizes of NF3 and CF4 so that the zeolite can adsorb only NF3 thereonto, but not CF4. If necessary, the ion exchange may be conducted two or more times to adjust the pore size suitable for the selective adsorption of nitrogen trifluoride.

After the ion exchange, the alkali earth metal in a zeolite is preferably in an amount of 20% to 95% by weight based on the total weight of the metal contents of the zeolite. For instance, when the alkali earth metal content is below 20% by weight, the metal exchanged inside the zeolite is too little to set zeolite pores at a size suitable for the adsorption exclusively for NF3. On the other hand, said content larger than 95% by weight cannot control the pore size appropriately, and adsorption of NF3 becomes poor.

Zeolite to be used in the present invention should be spherical in shape with a particle size preferably ranging from 4 to 100 meshes, and more preferably from 8 to 40 meshes. After being ion-exchanged with alkali earth metal, the zeolite having such particle sizes is thermally treated at 150 to 600° C., and preferably at 200 to 500° C., for 0.5 to 100 hours, preferably 2 to 50 hours, and more preferably 4 to 20 hours.

The thermal treatment in that the temperature range can make the zeolite useful as an adsorbent which has an adsorption capacity sufficient to achieve the object of the present invention. For example, if the thermal treatment is conducted at a temperature below 150° C., the zeolite, even if treated for a long period of time, sharply decreases in adsorption capacity immediately after operation, and thus, has a very small amount of nitrogen trifluoride adsorbed thereonto. This is believed to be attributed to the fact that, upon treatment at a temperature below 150° C., moisture molecules inside the zeolite occupy most positions onto which nitrogen trifluoride molecules will be adsorbed, deteriorating the NF3 adsorption capacity per unit volume of zeolite. In order to substantially dehydrate the zeolite, accordingly, the thermal treatement is preferably conducted at a temperature higher than 150° C.

On the other hand, a thermal treatment temperature higher than 600° C. gives rise to a change in the crystalline structure of zeolite or breaks the pores of zeolite, greatly deteriorating the adsorption capacity of the zeolite. As a result, the zeolite suffers from the problem of being unable to adsorb nitrogen trifluoride or showing adsorption saturation within a short time after gas permeation.

Preferably, the thermal treatment of zeolite is conducted in the presence of flowing inert gas, such as, nitrogen, helium, neon, argon, xenon, etc., which are substantially free of moisture. Also, the thermal treatment may be carried under reduced pressure with suction of the inert gas.

One of the method for the thermal treatment is that zeolite particles having a desired size distribution are laid in a thin layer on the bottom of a dryer and are heated, with an inert gas flowing over the thin zeolite particle layer. However, it is preferred that the thermal treatment and the adsorption and purification of nitrogen trifluoride gas be performed in one vessel. That is, most preferable method is that after being formed in a vessel or column, a bed of zeolite particles having an appropriate size distribution is thermally treated with a flow of inert gas therethrough, then the zeolite is cooled without being withdrawn from the vessel or column, and a gas mixture including nitrogen trifluoride is introduced into the bed of zeolite particles. The vessel or column may be made from a conventional material, such as stainless steel, copper, nickel, iron, etc.

As described above, the zeolite, after completion of the thermal treatment, is allowed to cool spontaneously or is subjected to forcible cooling to room temperature (25° C.) or lower. Upon cooling, the incorporation of moisture into zeolite particles should be avoided.

In accordance with the present invention, the refinement of nitrogen trifluoride is achieved in the following four steps using the synthetic zeolite pretreated according to the above-mentioned process.

First, a mixture gas of nitrogen trifluoride and carbon tetrafluoride is introduced into a column filled with pretreated zeolite 3A, 4A or 5A ion-exchanged with alkali earth metal so as to adsorb NF3 onto the zeolite molecular sieve.

Upon the permeation of the gas mixture including nitrogen trifluoride, the column is preferably in a temperature range between −100 and 50° C. and preferably between −50 and 30° C. Lower temperatures are more preferable for gas permeation but because practical operation is impossible at a temperature lower than −129° C., the boiling point of NF3, refinement is conducted at −100° C. or higher. At a temperature higher than 50° C., unnecessary heat supply is required.

For the permeation of the mixture gas including nitrogen trifluoride, inert gas may serve as a carrier. Any gas, inactive to NF3 and zeolite, may be used. Examples of the inert gas that can be used along with the target mixture gas include nitrogen, helium, neon, argon, and xenon. The inert gas is preferably used in an amount of 20 to 80 vol % based on the total volume of NF3, CF4 and the inert gas introduced.

As for the zeolite bed, it preferably has a diameter from 1 to 50 cm and a height from 5 to 200 cm. Upon the permeation of the gas mixture through the zeolite bed, the gas mixture preferably flows at a rate of 1 to 25 $g/cm^2 \cdot hr$ at a pressure of 1 to 10 kg/cm. In accordance with the present invention, the NF3 gas obtained by the refinement process has a CF4 content of 0 to 30 ppm.

Second, the selectively adsorbed NF3 is collected using a purging process.

The zeolite is purged with inert gas. In this regard, an inert gas is passed through the zeolite bed at a mass flow rate of 1 to 100 $g/cm^2 \cdot hr$ and preferably at a mass flow rate of 30 to 60 $g/cm\ 2 \cdot hr$. Any gas, as long as it is nonreactive with NF3 and zeolite, may be used for the collection of NF3, preferably nitrogen, helium, neon, argon and xenon. The mass flow rate is defined as linear velocity multiflied by fluid density (linear velocity X fluid density). A path having a constant cross section area is convenient particularly when treating gas because the mass flow rate is maintained constant even if the linear velocity varies upon heating/cooling during the purging process.

In the purging process, the zeolite should be maintained at a temperature of −30 to 50° C. and, preferably, 20 to 30° C. If the temperature is too low, it takes too much time to complete the purging process. On the other hand, too high temperature may allow impurities to chemically bind to the adsorbent, thereby it deteriorats the purity of the resulting NF3 gas.

Third, the adsorbent is regenerated through a temperature elevation and desorption process in which impurities remaining in a small amount within the adsorbent are completely removed. If the adsorption-purge processes are repeated without the temperature elevation and desorption, the adsorbent decreases further in adsorption capacity at every round of adsorption. Therefore, the temperature elevation and desorption process is essential.

The temperature elevation is conducted at a rate of 0.1 to 20° C./min, and preferably at a rate of 1 to 5° C./min, up to 500° C., and preferably 200° C., using flowing air or inert gas.

Finally, when the impurity content measured in NF3 gas obtained after the collection process is higher than a predetermined standard, the first to third steps are repeated.

MODE FOR THE INVENTION

A better understanding of the present invention may be obtained through the following examples which are set forth to illustrate, but are not to be construed as the limit of the present invention.

Preparation Example 1

Zeolite 3A (commercially available from Aldrich. Inc., particle size 8~12 meshed, spherical) was slowly added to a 1M solution of a precursor of alkali earth metal in distilled water and well mixed together. The suspension was allowed to react for 6 hours at 80° C. with slow stiffing, followed by recovery of the zeolite 3A through filtration. Thereafter, the zeolite 3A was dried at 130° C. for 6 hours in an oven and then baked at 500° C. for 12 hours to give a zeolite 3A ion-exchanged with an alkali earth metal in an amount of 50 weight %. An X-ray fluorescence spectrometer (XRF) was used to measure the content of the alkali earth metal in comparison with the total metal present inside the zeolite. The results are given in Table 1, below.

Preparation Example 21

A zeolite 3A ion-exchanged with alkali earth metal was prepared in a manner similar to that of Preparation Example 1, with the exception of a difference in the type and concentration of the alkali earth metal precursor solution, and the temperature and time period of the stirring. The results are given in Table 1, below.

Preparation Example 3

The same procedure as Preparation Example 1 was carried out, with the exception that zeolite 4A was used instead of zeolite 3A to produce a zeolite 4A that is ion-exchanged with alkali earth metal. The results are given in Table 2, below.

Preparation Example 4

The same procedure as Preparation Example 1 was carried out, with the exceptions of differences in type, concentration of the alkali earth metal precursor solution, and the temperature and time period of the stirring, to produce a zeolite 4A ion-exchanged with alkali earth metal. The results are given in Table 2, below.

Preparation Example 5

The same procedure as in Preparation Example 1 was carried out, with the exception that zeolite 5A was used instead of zeolite 3A, to produce a zeolite 5A ion-exchanged with alkali earth metal. The results are given in Table 3, below.

Preparation Example 6

A zeolite 5A ion-exchanged with alkali earth metal was prepared in the same procedure as in Preparation Example 1, except that there were differences in the type and concentration of the alkali earth metal precursor solution, and the temperature and/or time period of stirring. The results are given in Table 3, below.

Example I

After having filled to a height of 400 mm in a stainless steel column having an inner diameter of 10 mm, the alkali earth metal ion-exchanged zeolite 3A prepared in Preparation Examples 1 and 2 were thermally treated for 6 hours at 300° C. in an inert gas atmosphere. Next, the zeolite particle bed was cooled down to −20° C. and a mixture of inert gas, NF3 and CF4 (inert gas 50 vol %, NF3 49.75 vol %, CF4 0.25 vol %) was allowed to permeate therethrough at a weight flow rate of 22.5 (g/cm²·hr) until NF3 was sufficiently adsorbed onto the zeolite bed (about 3 hours). Subsequently, while being heated at an elevation rate of 5° C./min up to 30° C., the zeolite bed was purged with inert gas only so as to collect NF3 which was then quantitatively analyzed using gas chromatography. The results according to the types of the zeolite 3A used are given in Table 1, below.

Comparative Example I

For comparison, the same procedure as in Example 1 was conducted using a typical zeolite 3A (manufactured by Aldrich. Inc., particle size 8~12 meshes, spherical), which is not ion-exchanged with alkali earth metal. The results are given in Table 1, below.

TABLE 1

Adsorption Capacity of Zeolite 3A Ion-Exchanged with Alkali Earth Metal According to Types and Concentration of Cation

| CmP. | | Number of Example I | | | | | | | | | | | | | | | |
|---|---|---|---|---|---|---|---|---|---|---|---|---|---|---|---|---|---|
| | Ex. I | 1 | 2 | 3 | 4 | 5 | 6 | 7 | 8 | 9 | 10 | 11 | 12 | 13 | 14 | 15 | 16 |
| Metal exchanged | | Mg | | | | Ca | | | | Sr | | | | Ba | | | |
| exchanged metal content (wt %) | 0 | 20 | 50 | 80 | 95 | 20 | 50 | 80 | 95 | 20 | 50 | 80 | 95 | 20 | 50 | 80 | 95 |
| CF4 Content (ppm) | 22 | 452 | 241 | 295 | 308 | 368 | 231 | 275 | 287 | 356 | 222 | 267 | 268 | 257 | 205 | 250 | 255 |
| CF4 Removal (%) | 99.6 | 91.0 | 95.2 | 94.1 | 93.8 | 92.6 | 95.4 | 94.5 | 94.3 | 92.9 | 95.6 | 94.7 | 94.6 | 94.9 | 95.6 | 95.0 | 94.9 |
| adsorbed NF3 (cc/g) | 1.1 | 9.8 | 14.3 | 12.1 | 10.7 | 8.7 | 11.4 | 10.1 | 9.5 | 8.9 | 10.9 | 10.1 | 9.2 | 12.0 | 17.1 | 15.8 | 14.1 |

Example II

The same procedure as in Example I was conducted, except that zeolite 4A ion-exchanged with the alkali earth metal prepared in Preparation Examples 3 and 4 was used. The results are given in Table 2, below.

Comparative Example II

Using a typical zeolite 4A (manufactured by Aldrich. Inc., particle size 8-12 meshes, spherical), which was not ion-exchanged with alkali earth metal, the same procedure as in Example I was repeated. The results are given in Table 2, below.

TABLE 2

Adsorption Capacity of Zeolite 4A Ion-Exchanged with Alkali Earth Metal According to Types and Concentration of Cation

| Cmp. | | Number of Example II | | | | | | | | | | | | | | | |
|---|---|---|---|---|---|---|---|---|---|---|---|---|---|---|---|---|---|
| | Ex. II | 1 | 2 | 3 | 4 | 5 | 6 | 7 | 8 | 9 | 10 | 11 | 12 | 13 | 14 | 15 | 16 |
| Metal exchanged | | Mg | | | | Ca | | | | Sr | | | | Ba | | | |
| exchanged metal content (wt %) | 0 | 20 | 50 | 80 | 95 | 20 | 50 | 80 | 95 | 20 | 50 | 80 | 95 | 20 | 50 | 80 | 95 |
| CF4 Content (ppm) | 22 | 275 | 231 | 245 | 246 | 290 | 235 | 238 | 231 | 275 | 231 | 225 | 227 | 285 | 210 | 215 | 214 |
| CF4 Removal (%) | 99.6 | 94.5 | 95.4 | 95.1 | 95.1 | 94.2 | 95.3 | 95.2 | 95.4 | 94.5 | 95.4 | 95.5 | 95.5 | 94.3 | 95.8 | 95.7 | 95.7 |

TABLE 2-continued

Adsorption Capacity of Zeolite 4A Ion-Exchanged with Alkali Earth Metal According to Types and Concentration of Cation

| Cmp. | | | | | | Number of Example II | | | | | | | | | | |
|---|---|---|---|---|---|---|---|---|---|---|---|---|---|---|---|---|
| Ex. II | 1 | 2 | 3 | 4 | 5 | 6 | 7 | 8 | 9 | 10 | 11 | 12 | 13 | 14 | 15 | 16 |
| adsorbed NF3 (cc/g) | 0.4 | 16.9 | 18.7 | 14.8 | 13.1 | 14.1 | 17.6 | 15.0 | 13.5 | 15.8 | 16.8 | 14.6 | 12.5 | 14.1 | 15.3 | 14.7 | 14.2 |

Example III

The same procedure as in Example I was conducted, with the exception of using the zeolite 5A ion-exchanged with the alkali earth metal prepared in Preparation Examples 5 and 6. The results are given in Table 3, below.

Comparative Example III

Using a typical zeolite 5A (manufactured by Aldrich. Inc., particle size 8~12 meshes, spherical), which was not ion-exchanged with alkali earth metal, the same procedure as in Example I was repeated. The results are given in Table 3, below.

The zeolite 5A that was not ion-exchanged with alkali earth metal was found to adsorb both $CF_4$ and $NF_3$ thereonto, and thus, be incapable of separating $NF_3$.

TABLE 3

Adsorption Capacity of Zeolite 5A Ion-Exchanged with Alkali Earth Metal According to Types and Concentration of Cation

| Cmp. | | | | | | | | Number of Example III | | | | | | | | |
|---|---|---|---|---|---|---|---|---|---|---|---|---|---|---|---|---|
| Ex. III | 1 | 2 | 3 | 4 | 5 | 6 | 7 | 8 | 9 | 10 | 11 | 12 | 13 | 14 | 15 | 16 |
| Metal exchanged | | Mg | | | | Ca | | | | Sr | | | | Ba | | | |
| exchanged metal content (wt %) | | 0 | 20 | 50 | 80 | 95 | 20 | 50 | 80 | 95 | 20 | 50 | 80 | 95 | 20 | 50 | 80 | 95 |
| CF4 Content (ppm) | 3572 | 305 | 226 | 241 | 245 | 328 | 224 | 263 | 276 | 245 | 224 | 250 | 260 | 236 | 171 | 183 | 198 |
| CF4 Removal (%) | 28.6 | 93.9 | 95.5 | 95.2 | 95.1 | 93.4 | 95.5 | 94.7 | 94.5 | 95.1 | 95.5 | 95.0 | 94.8 | 95.3 | 96.6 | 96.3 | 96.0 |
| adsorbed NF3 (cc/g) | 49.1 | 15.8 | 18.4 | 19.4 | 20.5 | 13.7 | 18.2 | 19.6 | 21.8 | 14.8 | 21.6 | 19.9 | 20.8 | 20.7 | 22.2 | 22.1 | 21.8 |

Example IV

The same procedure as in Example I was carried out, with the exception that the zeolite particle bed was maintained at −50, 0 and 30° C. upon gas adsorption, and the adsorbed amounts of $CF_4$ and $NF_3$ gas were analyzed according to temperature changes. The results are given in Table 4, below.

TABLE 4

Adsorption Capacity of Zeolite 4A Ion-Exchanged with Alkali Earth Metal (Content 50 wt %) According to Temperatures of adsorbent Bed

| | Number of Example IV | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Metal exchanged | Mg | | | Ca | | | Sr | | | Ba | | |

TABLE 4-continued

Adsorption Capacity of Zeolite 4A Ion-Exchanged with Alkali Earth Metal (Content 50 wt %) According to Temperatures of adsorbent Bed

| | Number of Example IV | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| exchanged metal content (wt %) | −50 | 0 | 30 | −50 | 0 | 30 | −50 | 0 | 30 | −50 | 0 | 30 |
| CF4 Content (ppm) | 241 | 240 | 276 | 201 | 300 | 341 | 240 | 278 | 306 | 223 | 247 | 283 |
| CF4 Removal (%) | 95.2 | 95.2 | 94.5 | 96.0 | 94.5 | 93.2 | 95.2 | 94.4 | 93.9 | 96.5 | 95.1 | 94.3 |
| adsorbed NF3 (cc/g) | 20.5 | 17.1 | 14.7 | 19.8 | 16.2 | 11.4 | 19.1 | 16.2 | 14.1 | 18.7 | 12.4 | 9.0 |

Example V

The same procedure as in Example I was conducted, with the exception that He, N2 or Ar was used as a carrier gas for the NF3 gas in the amounts of 20 vol %, 40 vol % and 80 vol %, based on the total volume of the gas employed. The adsorbed amounts of CF4 and NF3 were analyzed according to the kinds and concentrations of the inert gas. The results are given in Table 5 and Table 6, below.

TABLE 5

Adsorption Capacity of Zeolite 5A Ion-Exchanged with Alkali Earth Metal (Content 50 wt %) According to Type and Concentration of Carrier Gas

| | | Number of Example V | | | | | | | | | | | | | | | | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 |
| Metal Exchanged | | Mg | | | | | | | | | Ca | | | | | | | | |
| Inert Gas | vol % | | 20 | | | 40 | | | 80 | | | 20 | | | 40 | | | 80 | |
| | Kind | He | N2 | Ar | He | N2 | Ar | He | N2 | Ar | He | N2 | Ar | He | N2 | Ar | He | N2 | Ar |
| CF4 Content (ppm) | | 330 | 402 | 432 | 236 | 344 | 417 | 283 | 421 | 518 | 293 | 367 | 441 | 245 | 305 | 377 | 278 | 439 | 521 |
| CF4 Removal (%) | | 93.4 | 92.0 | 91.4 | 95.3 | 93.1 | 91.7 | 94.3 | 91.6 | 89.6 | 94.1 | 92.7 | 91.2 | 95.1 | 93.9 | 92.5 | 94.4 | 91.2 | 89.6 |
| adsorbed NF3 (cc/g) | | 13.2 | 11.4 | 10.5 | 17.2 | 16.4 | 14.1 | 10.1 | 9.5 | 8.8 | 12.7 | 10.2 | 9.3 | 20.2 | 16.9 | 14.1 | 11.1 | 10.7 | 8.9 |

TABLE 6

TABLE 5-Continued

| | | Number of Example V | | | | | | | | | | | | | | | | | |
|---|---|---|---|---|---|---|---|---|---|---|---|---|---|---|---|---|---|---|---|
| | | 19 | 20 | 21 | 22 | 23 | 24 | 25 | 26 | 27 | 28 | 29 | 30 | 31 | 32 | 33 | 34 | 35 | 36 |
| Metal Exchanged | | Sr | | | | | | | | | Ba | | | | | | | | |
| Inert Gas | vol % | | 20 | | | 40 | | | 80 | | | 20 | | | 40 | | | 80 | |
| | Kind | He | N2 | Ar | He | N2 | Ar | He | N2 | Ar | He | N2 | Ar | He | N2 | Ar | He | N2 | r |
| CF4 Content (ppm) | | 295 | 371 | 447 | 244 | 294 | 277 | 297 | 346 | 337 | 293 | 407 | 467 | 205 | 246 | 297 | 278 | 341 | 432 |
| CF4 Removal (%) | | 94.1 | 92.6 | 91.1 | 95.1 | 94.1 | 94.5 | 94.1 | 93.1 | 93.3 | 94.1 | 91.9 | 90.7 | 95.9 | 95.1 | 94.1 | 94.4 | 93.2 | 91.4 |

TABLE 6-continued

TABLE 5-Continued

| | Number of Example V | | | | | | | | | | | | | | | | | |
|---|---|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 | 35 | 36 |
| adsorbed NF3 (cc/g) | 16.1 | 14.2 | 12.9 | 20.1 | 18.2 | 16.4 | 11.6 | 10.0 | 9.1 | 14.1 | 12.0 | 11.1 | 20.6 | 18.4 | 15.0 | 7.4 | 6.6 | 5.9 |

Example VI

In order to produce NF3 of ultra-high purity, the NF3 gas containing CF4, obtained in Example III-2, was permeated again through a bed of the zeolite 5A ion-exchanged with alkali earth metal. In short, the NF3 gas with a CF4 content of 226 ppm, produced through the primary refinement process of Example III-2, was allowed to pass through a storage tank of liquid nitrogen to collect a predetermined amount of an inert-gas free NF3 gas containing a trace amount of CF4. Separately, the zeolite 5A prepared in Preparation Example 5 was filled up to a height of 400 mm in a stainless steel column having an inner diameter of 10 mm and cooled to −20° C. The NF3 gas with a CF4 content of 226 ppm in a mixture of an equal volume of an inert gas was permeated through the bed of the zeolite 5A at a weight flow rate of 22.5 (g/cm²·hr) for a period of time (about 3 hours) sufficient to adsorb both NF3 and CF4 onto the bed. Thereafter, while the bed of the adsorbent was heated at an increased rate of 1° C./min up to 400° C., the NF3 which was desorbed from the bed was quantitatively analyzed. Gas chromatography showed that CF4 was removed at a rate higher than 99.3% based on the content before the primary refinement. The results are given in Table 7, below.

TABLE 7

Adsorption Capacity of Zeolite 5A Ion-Exchanged with Alkali Earth Metal (Content 50 wt %) after Two Rounds of Adsorption

| | Number of Example VI | | | |
|---|---|---|---|---|
| | 1 | 2 | 3 | 4 |
| Metal Exchanged | Mg | Ca | Sr | Ba |
| Bed Temp. at Adsorption (° C.) | −20 | −20 | −20 | −20 |
| CF4 Content(ppm) | 24 | 29 | 31 | 33 |
| CF4 Removal(%) | 99.52 | 99.42 | 99.38 | 99.34 |
| adsorbed NF3 (cc/g) | 18.4 | 18.2 | 21.6 | 22.2 |

The invention claimed is:

1. A process for refining nitrogen trifluoride gas, comprising:
   introducing a gas mixture of nitrogen trifluoride (NF3) and carbon tetrafluoride (CF4) into a bed of zeolite 3A, 4A or 5A to selectively adsorb nitrogen trifluoride onto the bed, with the carbon tetrafluoride passing through the bed, said zeolite 3A or 4A being ion-exchanged with magnesium, calcium, strontium or barium or said zeolite 5A being ion-exchanged with magnesium, strontium or barium; and recovering the nitrogen trifluoride from the bed.

2. The process as defined in claim 1, wherein the zeolite 3A or 4A contains the ion-exchanged magnesium calcium, strontium or barium in an amount of 20% to 95% by weight based on the total weight of metal within the zeolite 3A of 4A, or
   wherein the zeolite 5A contains the ion-exchanged magnesium, strontium or barium in an amount of 20% to 95% by weight based on the total weight of metal within the zeolite 5A.

3. The process as defined in claim 1, wherein the gas mixture of NF3 and CF4 is introduced into the bed at a temperature of −100 to 50° C.

4. The process as defined in claim 1, wherein the gas mixture of NF3 and CF4 is introduced in combination with an inert gas into the bed, said inert gas amounting to 20 to 80 vol % based on the total volume of NF3, CF4 and the inert gas introduced.

5. The process as defined in claim 4, wherein the inert gas is selected from the group consisting of argon, helium and nitrogen.

6. The process as defined in claim 1, wherein the introducing step of adsorbing nitrogen trifluoride(NF3) onto the zeolite 3A or 4A being ion-exchanged with magnesium, calcium, strontium or barium, or zeolite 5A being ion-exchanged with magnesium, strontium or barium, and the recovering step of nitrogen trifluoride from the zeolite is sequentially conducted two or more times.

* * * * *